(12) United States Patent
Kominami et al.

(10) Patent No.: US 9,377,244 B2
(45) Date of Patent: Jun. 28, 2016

(54) HEAT MEDIUM HEATING DEVICE AND VEHICLE AIR CONDITIONER INCLUDING THE SAME

(71) Applicant: MITSUBISHI HEAVY INDUSTRIES AUTOMOTIVE THERMAL SYSTEMS CO., LTD., Kiyosu-shi, Aichi (JP)

(72) Inventors: Satoshi Kominami, Tokyo (JP); Naoto Kunieda, Nagoya (JP)

(73) Assignee: MITSUBISHI HEAVY INDUSTRIES AUTOMOTIVE THERMAL SYSTEMS CO., LTD., Kiyosu-shi (JP)

( * ) Notice: Subject to any disclaimer, the term of this patent is extended or adjusted under 35 U.S.C. 154(b) by 478 days.

(21) Appl. No.: 13/740,938

(22) Filed: Jan. 14, 2013

(65) Prior Publication Data

US 2013/0192796 A1 Aug. 1, 2013

(30) Foreign Application Priority Data

Feb. 1, 2012 (JP) ................................. 2012-019930

(51) Int. Cl.
*F28D 1/00* (2006.01)
*F24H 1/14* (2006.01)
(Continued)

(52) U.S. Cl.
CPC *F28D 1/00* (2013.01); *F24H 1/142* (2013.01); *F24H 9/1827* (2013.01); *H05B 3/42* (2013.01);
(Continued)

(58) Field of Classification Search
CPC ......... B60H 1/2221; F24H 1/142; F24H 3/12; F24H 9/1827; F24H 3/002; F24H 3/0411; F24H 3/0429; F24H 3/0435; F28D 1/00; F28F 1/02; H05B 2203/009; H05B 2203/02; H05B 2203/023; H05B 3/42
USPC ............. 165/104.19, 152, 153; 392/479–480, 392/485–486, 491, 360, 347, 377
See application file for complete search history.

(56) References Cited

U.S. PATENT DOCUMENTS 4,728,779 A * 3/1988 Kotani et al. ................. 219/517
6,093,909 A 7/2000 Beetz et al.
(Continued)

FOREIGN PATENT DOCUMENTS

CN 101103242 A 1/2008
CN 1995850 B 5/2010
(Continued)

OTHER PUBLICATIONS

Office Action dated Dec. 3, 2014, issued in corresponding Chinese Patent Application No. 201310033937.4, with English translation (10 pages).
(Continued)

*Primary Examiner* — Dana Ross
*Assistant Examiner* — James Sims, III
(74) *Attorney, Agent, or Firm* — Westerman, Hattori, Daniels & Adrian, LLP (57) ABSTRACT

The heat medium heating device includes: a casing in which the flat heat exchange tubes 12 and the PTC heater 13 are stacked in multiple layers and incorporated; and a control substrate of the PTC heater 13 incorporated in the casing. In the heat medium heating device in which a terminal 25A extending from each electrode plate 25 of the PTC heater 13 is directly connected to a connection portion of the control substrate, the width dimension of the flat heat exchange tubes 12 is greater than a contact surface width in a direction in which the terminal 25A extends from each electrode plate 25 in the PTC element 24 of the PTC heater 13, and the electrode plates 25 and the flat heat exchange tubes 12 excluding the PTC element 24 are superimposed in the wide portion.

2 Claims, 5 Drawing Sheets

(51) Int. Cl.
*F24H 9/18* (2006.01)
*H05B 3/42* (2006.01)
*F28F 1/02* (2006.01)
*B60H 1/22* (2006.01)
*F24H 3/12* (2006.01)

(52) U.S. Cl.
CPC ............... *B60H 1/2221* (2013.01); *F24H 3/12* (2013.01); *F28F 1/02* (2013.01); *H05B 2203/009* (2013.01); *H05B 2203/02* (2013.01); *H05B 2203/023* (2013.01)

(56) References Cited

U.S. PATENT DOCUMENTS

| | | | |
|---|---|---|---|
| 6,265,692 B1* | 7/2001 | Umebayahi et al. | 219/202 |
| 7,971,799 B2* | 7/2011 | Colette et al. | 237/12.3 B |
| 2008/0000889 A1* | 1/2008 | Niederer et al. | 219/205 |
| 2008/0053981 A1 | 3/2008 | Adachi et al. | |

FOREIGN PATENT DOCUMENTS

| | | |
|---|---|---|
| JP | 9-273886 A | 10/1997 |
| JP | 2001-279783 A | 10/2001 |
| JP | 2002-295988 A | 10/2002 |
| JP | 2004-293880 A | 10/2004 |
| JP | 2006-342997 A | 12/2006 |
| JP | 2008-007106 A | 1/2008 |
| JP | 2010-252460 A | 11/2010 |
| JP | 2011-016489 A | 1/2011 |
| JP | 2011-079344 A | 4/2011 |

OTHER PUBLICATIONS

Decision to Grant a Patent dated Jul. 1, 2015, issued in counterpart Chinese Patent Application No. 201310033937.4 w/English translation (2 pages). Explanation of Relevance—"The Decision to Grant a Patent has been received."

Japanese Office Action dated Dec. 1, 2015, issued in counterpart Japanese Patent Application No. 2012-019930. (4 pages).

* cited by examiner

HEAT MEDIUM HEATING DEVICE AND VEHICLE AIR CONDITIONER INCLUDING THE SAME

CROSS-REFERENCE TO RELATED APPLICATIONS

This application is based on Japanese Patent Application No. 2012-019930, the contents of which are incorporated herein by reference.

BACKGROUND OF THE INVENTION

1. Field of the Invention

The present invention relates to a heat medium heating device that heats a heat medium using a PTC heater, and a vehicle air conditioner including the heat medium heating device.

2. Description of Related Art

There is known a heat medium heating device which is provided in a vehicle air conditioner applied to an electric vehicle, a hybrid vehicle, or the like to heat a heated medium serving as a heat source for heating. The heat medium heating device incorporates a PTC heater using a positive characteristic thermistor element (Positive Temperature Coefficient; hereinafter referred to as "PTC element") as a heat generation element. Japanese Unexamined Patent Application, Publication No. 2008-7106 discloses an example of such a heat medium heating device. The heat medium heating device has a structure in which a number of partitions are provided to partition the inside of a housing including an outlet/inlet path for heat medium into a heating chamber and a heat medium circulation chamber, and PTC heaters are inserted and placed so as to contact the partitions on the heating chamber side to heat the heat medium circulating on the circulation chamber side. Further, a control substrate of each PTC heater is disposed at an upper position thereof.

In addition, Japanese Unexamined Patent Application, Publication No. 2011-16489 discloses a heat medium heating device having a stacked structure in which a pair of heat medium circulating portions are stacked and disposed on both surfaces of each PTC heater so as to sandwich each PTC heater, and a substrate accommodating portion that accommodates a control substrate is provided on one side. Furthermore, Japanese Unexamined Patent Application, Publication No. 2011-79344 discloses a heat medium heating device in which a heat exchange portion provided with a number of flat heat exchange tubes between a pair of headers in a casing including an outlet/inlet path for heat medium; PTC heaters are placed between the flat heat exchange tubes; and a control substrate of each PTC heater is disposed at an upper position thereof.

Thus, the techniques disclosed in Japanese Unexamined Patent Application, Publication Nos. 2008-7106 and 2011-79344 have problems in that it is difficult to bring each partition serving as a heat transfer surface or the flat heat exchange tube into close contact with each PTC heater; and the heat transfer efficiency is reduced, for example. On the other hand, according to the technique disclosed in Japanese Unexamined Patent Application, Publication No. 2011-16489, each PTC heater and each heat medium circulating portion can be stacked to fastened and fixed, thereby increasing the adhesion and reducing the contact thermal resistance. However, it is difficult to dispose a number of PTC heaters in multiple layers, and there are limitations on reduction in size and weight and reduction in costs.

Under such circumstances, the heat medium heating device has been developed in which heat exchange tubes each having a flat structure are used; the flat heat exchange tubes and PTC heaters are stacked in multiple layers to constitute a heat exchange element; the heat exchange element is fastened and fixed to be incorporated into a casing, thereby making it possible to improve the heat transfer efficiency and reduce the size, weight, and costs.

BRIEF SUMMARY OF THE INVENTION

In the related art heat medium heating device described above, however, there is employed a connection structure in which a control substrate for controlling the energization to a PTC heater is disposed in a casing to directly connect a terminal extending from an electrode plate of the PTC heater to a connection portion of the control substrate. The connection structure of the direct connection type enables the structure of the heat medium heating device to be simplified, and reduced in cost and size, for example, whereas the heat generated in the PTC heater is directly conducted to the control substrate through the terminal of the electrode plate. For this reason, a power transistor, such as an IGBT serving as a heat generation part, is mounted, which causes a problem that the control substrate to be originally cooled is at the risk of being overheated, for example.

As for the risk of overheating, the heat is liable to be conducted as the thickness of the heat exchange element decreases and as the distance between the electrode plate of the PTC heater and the control substrate disposed in the casing decreases, and the risk tends to increase. Accordingly, some measures need to be taken for a structure in which the control substrate is disposed in proximity to the PTC heater, so as to achieve downsizing and compactification, for example.

The present invention has been made in view of the above-mentioned circumstances, and has an object to provide a heat medium heating device capable of overcoming a risk that heat generated in each PTC heater conducts to a control substrate side through a terminal extending from an electrode plate, which causes overheating of the control substrate, and a vehicle air conditioner including the heat medium heating device.

To solve the above-mentioned problems, the heat medium heating device and the vehicle air conditioner including the same according to the present invention employs the following solutions.

That is, a heat medium heating device according to the present invention includes: a plurality of flat heat exchange tubes through which a heat medium flowing from an inlet header portion flows through a flat tube portion and flows out from an outlet header portion; a PTC heater including a PTC element incorporated between the flat tube portions of the plurality of stacked flat heat exchange tubes and a pair of electrode plates sandwiching the PTC element; a casing including a heat medium outlet/inlet path communicating with an outlet/inlet header portion of each of the flat heat exchange tubes, the flat heat exchange tubes and the PTC heater being stacked in multiple layers and incorporated in the casing; and a control substrate that is incorporated in the casing and controls the PTC heater, a terminal extending from the electrode plate of the PTC heater being directly connected to a connection portion of the control substrate. The flat heat exchange tubes have a width dimension greater than a contact surface width in a direction in which the terminal extends from the electrode plates in the PTC element of the PTC heater, and the electrode plates and the flat heat exchange tubes excluding the PTC element are superimposed in the wide portion.

According to the present invention, the heat medium heating device including: a plurality of flat heat exchange tubes; a PTC heater incorporated between the flat heat exchange tubes; a casing in which the flat heat exchange tubes and the PTC heaters are stacked in multiple layers; and a control substrate for the PTC heaters incorporated in the casing. In the heat medium heating device in which a terminal extending from electrode plates of each PTC heater is directly connected to a connection portion of the control substrate, the width dimension of each flat heat exchange tube is greater than a contact surface width in a direction in which the terminal extends from the electrode plates in the PTC element of each PTC heater, and the electrode plates and the flat heat exchange tubes excluding the PTC element are superimposed in the wide portion. Accordingly, each of the flat heat exchange tubes is wider than the contact surface of each PTC element, and in the wide portion superimposed on the electrode plate, the electrode plates are prevented from contacting the contact surface of each PTC element and from being heated. In addition, heat transferred to the electrode plates can be radiated to the superimposed flat heat exchange tube side. Consequently, the amount of heat transferred to the connection portion of the control substrate through the terminal extending from each electrode plate can be reduced, and overheating due to the heat conduction from the electrode plates of the control substrate can be prevented. This enhances the heat performance of the control substrate and suppresses a malfunction or the like, thereby improving the reliability of the heat medium heating device.

Further, the heat medium heating device according to the present invention has a feature that in the heat medium heating device described above, the electrode plates are provided with a slit along an end side direction in the portion wider than the contact surface of the PTC element.

According to the present invention, the electrode plates are provided with a slit along an end side direction in a portion wider than a contact surface of the PTC element. Accordingly, the slit blocks the heat flow that conducts through the electrode plates toward the terminal side, and the heat conduction distance toward the terminal side is increased to radiate the heat within the distance, thereby making it possible to reduce the temperature of the heat transferring the terminal. Consequently, the amount of heat transferred to the connection portion of the control substrate through the terminal and the temperature thereof are reduced, thereby reliably preventing overheating on the control substrate side.

Furthermore, the heat medium heating device according to the present invention has a feature that in any of the above-mentioned heat medium heating devices, the terminal extending from each electrode plate extend from an end side portion opposed to a region in which the slit is provided.

According to the present invention, the terminal extending from each electrode plate extends from the end side portion opposed to the region in which the slit is provided. Accordingly, the slit blocks the heat flow that conducts through the electrode plates toward the terminal side, and allows the heat flow to bypass the slit to thereby guide the heat to take the long way toward the terminal side to radiate the heat therebetween, thereby reducing the temperature. Accordingly, the amount of heat transferred to the connection portion of the control substrate through the terminal and the temperature thereof are reliably reduced, thereby making it possible to prevent overheating on the control substrate side.

Moreover, in the vehicle air conditioner according to the present invention, the heat medium heating device having a structure in which the heat medium heated by the heat medium heating device is allowed to circulate with respect to a radiator disposed in an air flow passage is one of the heat medium heating devices described above.

According to the present invention, in the vehicle air conditioner having a structure in which the heat medium heated by the heat medium heating device is allowed to circulate with respect to the radiator disposed in the air flow passage, the heat medium heating device is one of the heating medium heating devices described above. Accordingly, the heat medium to be supplied to the radiator disposed in the air flow passage can be heated and supplied by the heat medium heating device capable of preventing overheating due to heat conduction from the electrode plates of each PTC heater, enhancing the heat performance of the control substrate, and improving the reliability. Consequently, the heating performance of the vehicle air conditioner can be stabilized, and occurrence of malfunction, for example, can be prevented, thereby improving the reliability.

According to the heat medium heating device of the present invention, the flat heat exchange tubes are wider than the contact surface of the PTC element. In the wide portion superimposed with the electrode plate, the electrode plates are prevented from contacting the contact surface of the PTC element and from being heated, and the heat transferred to the electrode plates can be radiated to the superimposed flat heat exchange tube side. Consequently, the amount of heat transferred to the connection portion of the control substrate through the terminal extending from each electrode plate can be reduced, and overheating due to heat conduction from the electrode plates of the control substrate can be prevented. Moreover, the heat performance of the control substrate can be enhanced and malfunction or the like are suppressed, thereby improving the reliability of the heat medium heating device.

Further, according to the vehicle air conditioner of the present invention, the heat medium to be supplied to the radiator disposed in the air flow passage can be heated and supplied by the heat medium heating device capable of preventing overheating due to heat conduction from the electrode plates of the PTC heater, enhancing the heat performance of the control substrate, and improving the reliability. Therefore, the heating performance of the vehicle air conditioner can be stabilized, and occurrence of malfunction, for example, is prevented, thereby improving the reliability.

DETAILED DESCRIPTION OF THE INVENTION

Hereinafter, an embodiment of the present invention will be described with reference to FIGS. 1 to 5.

Figure 1:
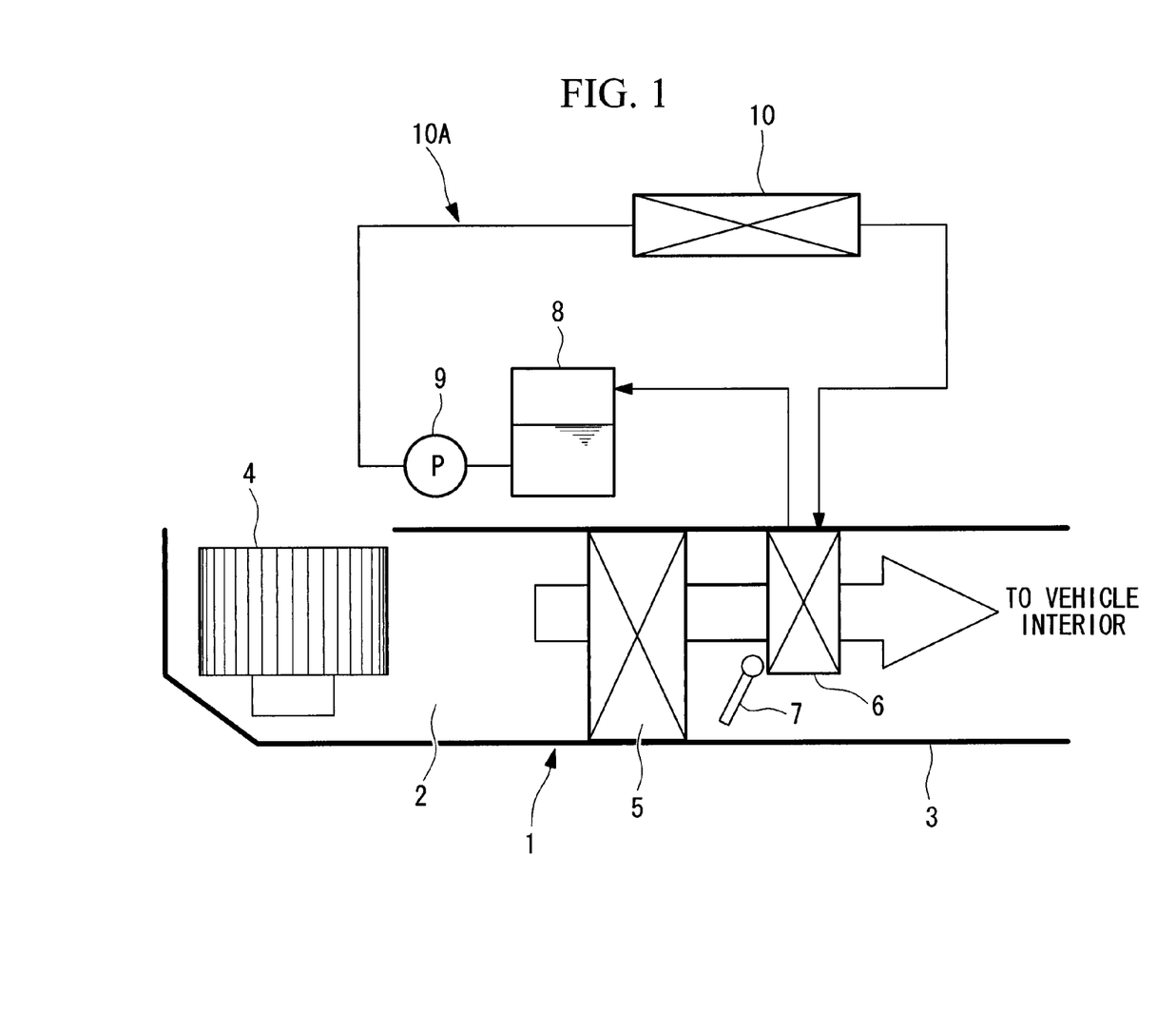
FIG. 1 is a schematic block diagram of a vehicle air conditioner including a heat medium heating device according to an embodiment of the present invention.

FIG. 1 illustrates a schematic block diagram of a vehicle air conditioner including a heat medium heating device according to an embodiment of the present invention.

A vehicle air conditioner 1 includes a casing 3 that forms an air flow passage 2 for taking an external air or in-vehicle air into the casing to control the temperature, and for guiding the air into the vehicle interior.

The casing 3 includes a blower 4, a cooler 5, a radiator 6, and an air mix damper 7. The blower 4 sequentially intakes and pressurizes the external air or in-vehicle air from an upstream side to a downstream side of the air flow passage 2, and feeds the air by pressure to the downstream side. The cooler 5 cools the air which is pressure-fed by the blower 4. The radiator 6 heats the air passing through the cooler 5 and cooled. The air mix damper 7 adjusts the flow rate ratio between the amount of air passing through the radiator 6 and the amount of air bypassing the radiator 6, and mixes it with air on the downstream side, thereby adjusting the temperature for temperature control wind.

The downstream side of the casing 3 is connected to a plurality of air outlets for blowing out the temperature-controlled air in the vehicle interior through a blowout mode switching damper and a duct which are not illustrated.

The cooler 5 constitutes a coolant circuit with a compressor, a condenser, an expansion valve, and the like which are not illustrated, and evaporates the coolant subjected to adiabatic expansion by the expansion valve, thereby cooling the air passing therethrough. The radiator 6 constitutes a heat medium circulation circuit 10A with a tank 8, a pump 9, and a heat medium heating device 10, and allows the heat medium (for example, antifreeze, or water) which is heated by the heat medium heating device 10 to circulate through the pump 9, thereby heating the air passing therethrough.

Figure 2:
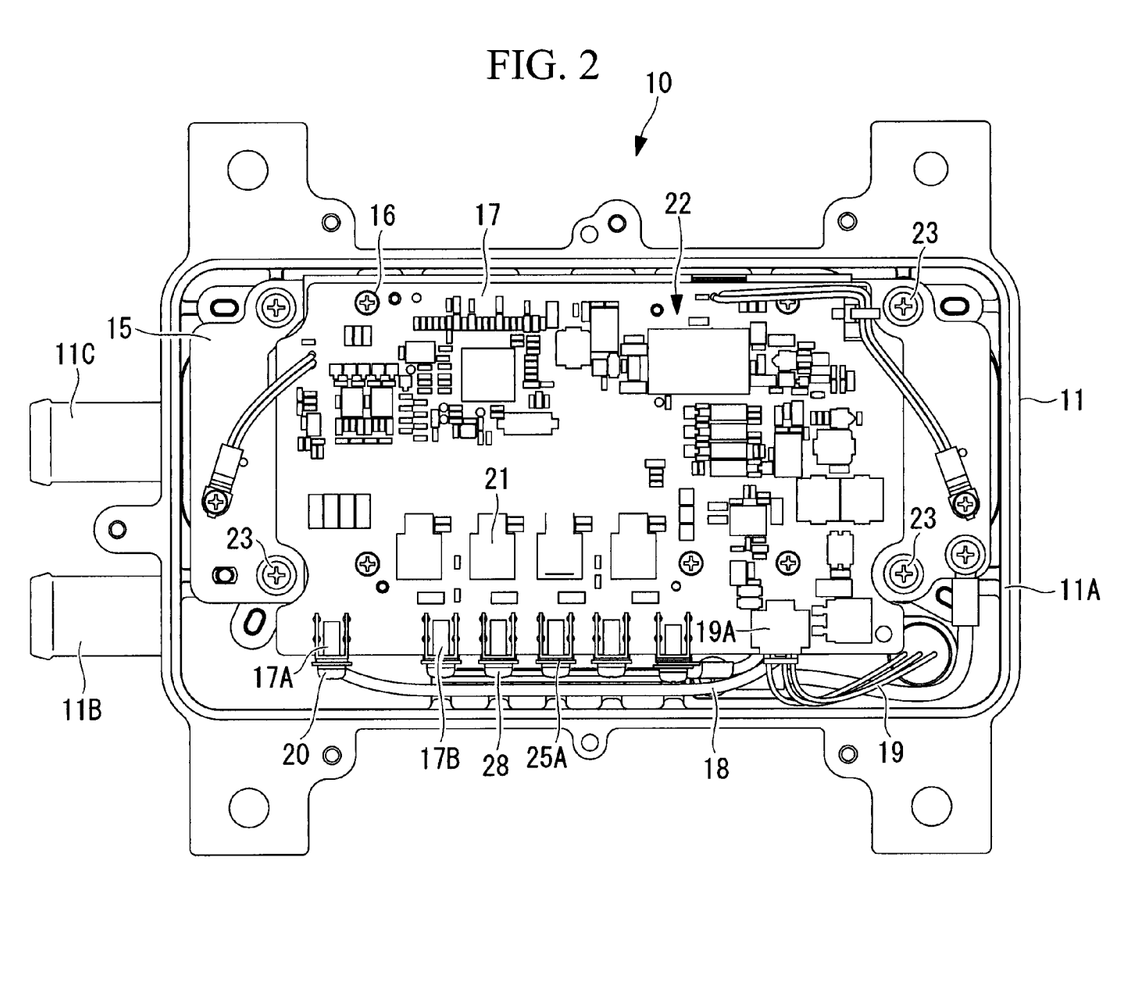
FIG. 2 is a plan view illustrating a state where an upper case of the heat medium heating device illustrated in FIG. 1 is dismounted.
Figure 3:
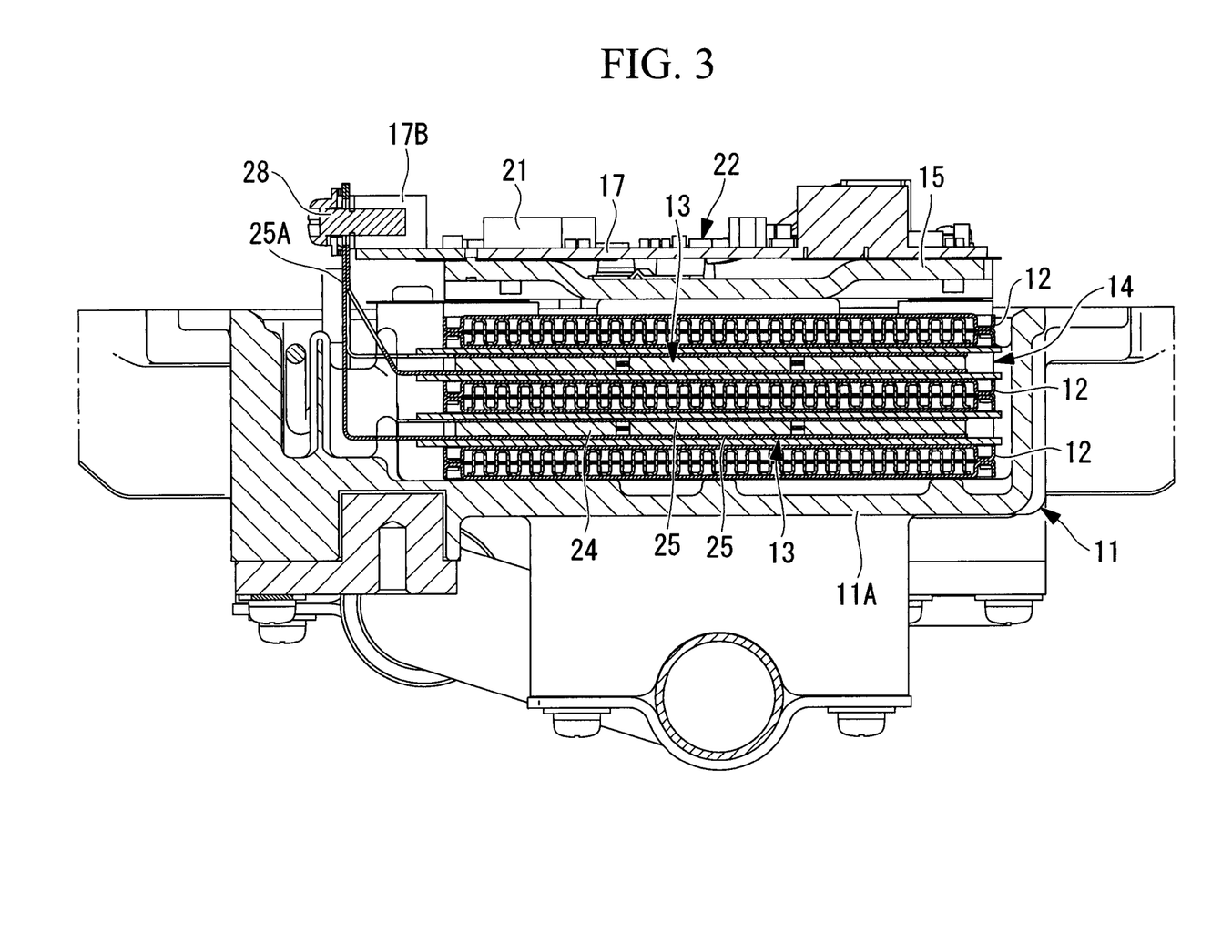
FIG. 3 is a longitudinal sectional view taken along a short side direction of the heat medium heating device illustrated in FIG. 2.
Figure 4:
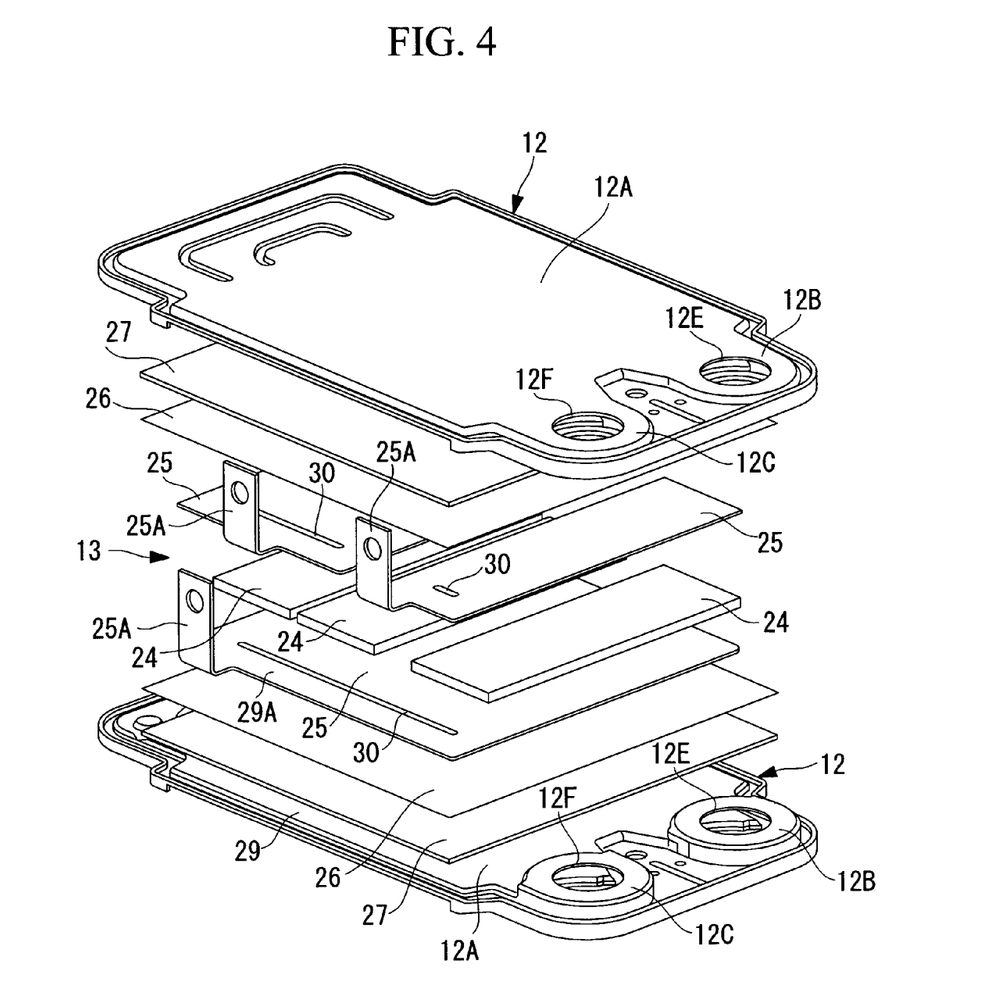
FIG. 4 is an exploded perspective view of PTC heaters stacked are stacked and disposed between a pair of upper and lower flat heat exchange tubes of the heat medium heating device illustrated in FIG. 3.
Figure 5:
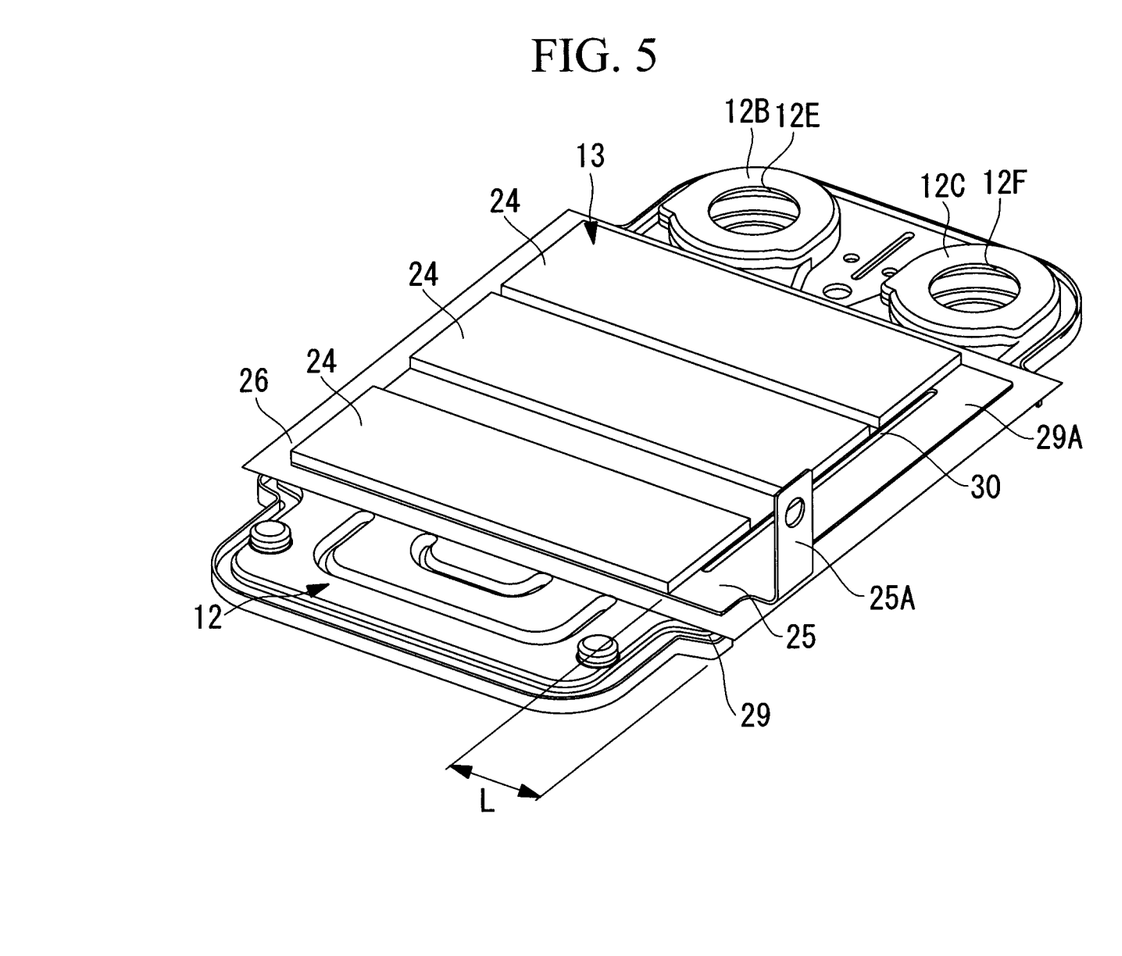
FIG. 5 is a perspective view illustrating an arrangement relationship between the flat heat exchange tube, the PTC element and the electrode plate of the PTC heater illustrated in FIG. 4.

FIG. 2 illustrates a plan view of the state where an upper case of the heat medium heating device 10 described above is dismounted. FIG. 3 illustrates a longitudinal sectional view taken along the short side direction thereof. FIG. 4 illustrates an exploded perspective view of the PTC heaters stacked between a pair of upper and lower flat heat exchange tubes. FIG. 5 illustrates a perspective view of the arrangement relationship between the flat heat exchange tubes and the PTC elements and electrode plates of the PTC heaters.

The heat medium heating device 10 includes a casing 11 having a box-shape structure; heat exchange modules 14 formed by alternately stacking a plurality of (for example, three) flat heat exchange tubes 12 and a plurality of pairs of PTC heaters 13 in multiple layers; a heat exchange pressing member 15 for pressing and fixing the heat exchange modules 14 to the inner bottom surface of a lower case 11A of the casing 11; and a control substrate 17 which is fixed and installed on the heat exchange pressing member 15 with a plurality of fixation screws 16 and which controls the energization to the PTC heaters 13.

The casing 11 is a box-shape casing divided into an upper half portion and a lower half portion, and has a structure in which an upper case (not illustrated) which is positioned at the upper half portion is screwed and fixed to the lower case 11A, which is positioned at the lower half portion, through a plurality of screws, thereby integrating the upper case and the lower case. In the internal space of the casing 11, the heat exchange modules 14 composed of the flat heat exchange tubes 12 and PTC heaters 13 described above, the heat exchange pressing member 15, the control substrate 17, and the like are accommodated and installed.

A heat medium inlet path 11B for guiding the heat medium to the three stacked flat heat exchange tubes 12, and a heat medium outlet path 11C for guiding the heat medium which is circulated and heated in the flat heat exchange tubes 12 are integrally formed so as to project downward on the lower surface of the lower case 11A. Further, boss portions (not illustrated) for fastening and fixing the heat exchange pressing member 15 are integrally formed so as to project upward at four positions in the casing. The lower case 11A is formed of a resin material (for example, PPS) having a linear expansion coefficient approximate to that of an aluminum alloy material forming each flat heat exchange tube 12 accommodated and installed in the internal space. Also the upper case is desirably formed of a resin material similar to that of the lower case 11A.

Furthermore, at the lower surface of the lower case 11A, a power harness hole and an LV harness hole (each of which is not illustrated) are opened to penetrate through the leading edge of each of a power harness 18 and an LV harness 19. The power harness 18 is used to supply power to each PTC heater 13 through the control substrate 17, and the leading edge of the power harness 18 is branched into two parts, which enables screwing into two power harness terminal boards 17A, which are provided on the control substrate 17, through screws 20. The LV harness 19 is used to transmit signals for control to the control substrate 17, and the leading edge of the LV harness is connected to the control substrate 17 through a connector 19A.

The control substrate 17 controls the energization to the plurality of pairs of PTC heaters 13 based on an instruction from an upper control device (ECU). A control circuit 22 including a plurality of power transistors (exothermic electrical components) 21 composed of an FET, an IGBT, and the like are mounted on the surface. The energization state with respect to the plurality of pairs of PTC heaters 13 is configured to be switched through the control circuit 22. This control substrate 17 has a structure in which a heat penetration portion (not illustrated) made of a high thermal conductive material, such as copper or aluminum, is provided to penetrate through the upper and lower surfaces of the substrate so as to correspond to a portion in which at least the plurality of power transistors 21 serving as an exothermic electrical component is mounted.

The plurality of flat heat exchange tubes 12 is stacked so as to sandwich the plurality of pairs of PTC heater 13, thereby constituting heat exchange modules 14. As illustrated in FIGS. 3 and 4, this flat heat exchange tube 12 has a structure in which a pair of tube materials obtained by press-molding a thin plate made of an aluminum alloy are superimposed. As illustrated in FIG. 3, for example, the three flat heat exchange tubes 12 are stacked so as to be in parallel with each other, and the PTC heaters 13 are sandwiched between the flat heat exchange tubes 12 and stacked in multiple layers, thereby constituting a pair of heat exchange modules 14.

Each flat heat exchange tube 12 includes a flat tube portion 12A formed by superimposing a pair of tube materials and having a flat sectional shape with a thickness of about several millimeters as described above; an inlet header portion 12B into which the heat medium formed at one end or both ends thereof flows; and an outlet header portion 12C from which the heat medium flows. Further, an inner fin 12D having a corrugated plate shape is inserted, as needed, into the flat tube portion 12A, and a plurality of heat medium flow passages is formed in the flat tube portion 12A. The flat heat exchange tube 12 may have a well-known structure.

The three flat heat exchange tubes 12 has a structure in which a lower stage, a middle stage, and an upper stage are sequentially stacked; the inlet header portion 12B and the outlet header portion 12C, which are provided at one end or both ends of each flat heat exchange tube 12, are brought into close contact with each other through a seal material such as an O-ring; and communicating holes 12E and 12F formed in the inlet header portion 12B and the outlet header portion 12C communicate with each other. The three flat heat exchange tubes 12 are in the stacked state, or are sequentially stacked and incorporated into the inner bottom surface within the lower case 11A. Further, as described later, the flat heat exchange tubes 12 are pressed and fixed to the inner bottom surface of the lower case 11A by the heat exchange member 15 which is fastened and fixed to boss portions of the lower case 11A with four screws 23.

Each PTC heater 13 is sandwiched between the three flat heat exchange tubes 12 described above, thereby constituting a pair of heat exchange modules 14. As illustrated in FIGS. 3 and 4, the plurality of pairs of PTC heaters 13 has a structure in which a pair of plus-side and minus-side electrode plates 25 are arranged so as to contact the upper and lower surfaces of the plurality of PTC (Positive Temperature Coefficient) elements 24. The plurality of pairs of PTC heaters 13 is stacked and arranged between the three flat heat exchange tubes 12 through an insulating film 26 and a thermal conductive sheet 27. The PTC heaters 13 are in the stacked state with the three flat heat exchange tubes 12, or are sequentially stacked and incorporated into the inner bottom surface of the lower case 11A, and are pressed and fixed to the inner bottom surface of the lower case 11A through the heat exchange pressing member 15.

A pair of electrode plates 25 is used to supply power to the PTC element 24, and is formed of a plate material made of an aluminum alloy having a rectangular shape in plan view. In this embodiment, this electrode plates 25 have a structure in which one electrode plate is stacked and arranged on each of the right and left sides so as to be in contact with the upper surface of the PTC element 24 with respect to the both surfaces sandwiching the plurality of PTC elements 24, and a wide electrode plate is stacked and arranged so as to be in contact with the lower surface of the PTC element 24. The two electrode plates 25 on the upper surface and the one electrode plate 25 on the lower surface sandwich the PTC element 24 from the upper and lower surfaces.

Further, the electrode plates 25 arranged on the upper surface side of the PTC element 24, and are arranged so that the upper surface contacts the lower surface of the flat heat exchange tube 12 through the insulating film 26 and thermal conductive sheet 27. The electrode plates 25 arranged on the lower surface side of the PTC element 24 are arranged so that the lower surface contacts the upper surface of the flat heat exchange tube 12 through the insulating film 26 and thermal conductive sheet 27. In this embodiment, the electrode plates 25 are arranged between the lower-stage flat heat exchange tube 12 and the middle-stage flat heat exchange tube 12 and between the middle-stage flat heat exchange tube 12 and the upper-stage flat heat exchange tube 12.

These electrode plates 25 each have one terminal 25A extending from an edge on one side thereof and thus are integrally formed. The terminals 25A are arranged to be shifted in the side direction of the electrode plates 25 so as not to overlap each other when the electrode plates 25 are stacked and arranged as described above. In other words, the terminals 25A respectively provided to the electrode plates 25 are provided to be shifted from each other in the side direction, and are aligned in series during stacking. Further, each of the terminals 25A projects horizontally from the electrode plates 25 and has an L-shape extending upward. The terminals 25A are connected to a plurality of pairs of terminal boards (connection portions) 17B, which are provided in parallel on one side on the front surface side of the control substrate 17, through screws 28.

The plurality of flat heat exchange tubes 12 and the plurality of pairs of PTC heaters 13 are in the stacked state or sequentially stacked and incorporated into the inner bottom surface of the lower case 11A as described above. The upper surface of the uppermost-stage flat heat exchange tube 12 is pressed in the inner bottom surface direction of the lower case 11A through the heat exchange pressing member 15 which is fastened and fixed to the boss portions (at four positions) of the lower case 11A with the four screws 23. This allows the upper and lower surfaces of the inlet header portion 12B and the outlet header portion 12C of each flat heat exchange tube 12 to be brought into close contact with each other, and allows the upper and lower surfaces of the flat tube portion 12A and the PTC heater 13 of each flat heat exchange tube 12 to be brought into close contact with each other.

Thus, in the process in which the heat medium introduced from the heat medium inlet path 11B of the lower case 11A to the heat exchange module 14 incorporated into the casing 11 is guided into the flat tube portion 12A from the inlet header portion 12B of each flat heat exchange tube 12 and circulates in the flat tube portion 12A, the heat medium is heated by the PTC heater 13 and increased in temperature and flown out to each outlet header portion 12C. The heat medium is delivered out of the heat medium heating device 10 through the heat medium outlet path 11C of the lower case 11A. Then, the heat medium delivered from the heat medium heating device 10 is supplied to the radiator 6 through the heat medium circulation circuit 10A (see FIG. 1).

The heat exchange pressing member 15 also functions as a heat sink that cools a plurality of exothermic electrical components 21 mounted on the surface of the control substrate 17 through a heat penetration portion made of a high thermal conductive material such as copper or aluminum is formed of a plate material made of an aluminum alloy. This heat exchange pressing member 15 has a size that covers the upper surface of the flat heat exchange tube 12. The dimension in the longitudinal direction of the heat exchange pressing member 15 is longer than that of the control substrate 17. When the heat exchange module 14 composed of the flat heat exchange tube 12 and the PTC heater 13 is pressed and fixed, the heat exchange mode 14 is fastened and fixed to the boss portion on the casing 11 side with the screw 23 at the position passing through the central line so as to secure the sealing properties in the vicinity of the inlet header portion 12B and the outlet header portion 12C of the flat heat exchange tube 12.

In the heat medium heating device 10 described above, the terminals 25A extending from the electrode plates 25 of each PTC heater 13 are directly connected to the terminal boards (connection portions) 17B on the control substrate 17 through the screws 28 as illustrated in FIG. 3. Accordingly, the heat conducting through the electrode plates 25 by heat generation of the PTC element 24 directly conducts to the control substrate 17 side through the terminals 25A, which may cause overheating of the control substrate 17. In view of this, in this embodiment, the following structures are employed to reduce the amount of heat transferred to the control substrate 17 side through the terminals 25A extending from the electrode plates 25 and the temperature thereof.

In one of the structures, as illustrated in FIG. 5, the width dimension of the flat tube portion 12A of each flat heat exchange tube 12 and each electrode plate 25 is set to be greater than the contact surface by a width dimension (width dimension) L in the direction in which the terminals 25A extend from the electrode plates 25 in the PTC element 24 forming the PTC heater 13. In the wide portion 29, the electrode plates 25 and the flat heat exchange tube 12 excluding the PTC element 24 are superimposed. This allows the electrode plates 25 to easily radiate heat to the flat heat exchange tube 12 without being heated by the PTC element 24 in at least the wide portion 29.

In another structure, the slit 30 is provided along the end side direction in a wide portion 29A which is wider than the contact surface of the PTC element 24 in the electrode plates 25. This slit 30 blocks the heat flow conducting through the electrode plates 25 toward the terminals 25A. As illustrated in FIGS. 4 and 5, the slit 30 may be one long continuous slit along the end side direction. However, the slit 30 is not limited thereto, and a plurality of slits intermittently separated may be used.

However, the slit 30 is provided in a region opposed to the terminal 25A extending from the electrode plates 25. In other words, the terminal 25A extends from an end side portion opposed to the region in which the slit 30 is provided.

In the heat medium heating device 10 described above, the three flat heat exchange tubes 12 and each PTC heater 13 composed of a plurality of pairs of PTC elements 24 and electrode plates 25 are sequentially stacked and incorporated in the inner bottom surface of the lower case 11A of the casing 11, while sandwiching the insulating film 26 and thermal conductive sheet 27 between the both surfaces of each PTC heater 13. At the stage where the heat exchange module 14 is incorporated, the heat exchange pressing member 15 presses the upper surface to be fasted and fixed to the lower case 11A side, or the heat exchange module 14 is sub-assembled and incorporated into the lower case 11A. The upper surface is pressed down by the heat exchange pressing member 15 and is pressed to be fastened and fixed toward the inner bottom surface of the lower case 11A through the screws 23, thereby enabling each flat heat exchange tube 12 and each PTC heater 13 to be incorporated in the state of being in close contact with each other.

In the case of incorporating the heat exchange module 14 in the manner as described above, each flat heat exchange tube 12, each PTC heater 13, the PTC element 24 and electrode plates 25 constituting each PTC heater 13, the insulating film 26, thermal conductive sheet 27, and the like are positioned and incorporated by fitting positioning holes or recesses into positioning protrusions or the like. This allows the terminals 25A provided on the respective electrode plates 25 to be aligned with the plurality of terminal boards (connection portions) 17B provided on the control substrate 17 which is fixed and installed on the heat exchange pressing member 15.

After the heat exchange module 14 is incorporated, an insulating sheet or the like is interposed on the heat exchange pressing member 15 to screw and fix the control substrate 17 with the screws 16, and a connection operation of an electrical system for the control substrate 17 is carried out. In this case, a leading edge of the power harness 18, which is branched into two parts, is screwed and fixed to the two terminal boards 17A for power harness through the screws 20. The connector 19A provided at the leading edge of the LV harness 19 is connected to the control substrate 17 side. Further, the terminals 25A provided on the respective electrode plates 25 are screwed and fixed to the terminal boards 17B on the control substrate 17 side through the screws 28, thereby allowing the terminals 25A to be electrically connected.

After completion of the electrical connection as described above, the upper case (not illustrated) is screwed and fixed to the lower case 11A so as to cover the upper portion, thereby enabling assembly of the heat medium heating device 10. In this heat medium heating device 10, the heat medium flowing into the inlet header portion 12B of the flat heat exchange tube 12 through the heat medium inlet path 11B is circulated in the flat tube portion 12A of a plurality of (three) flat heat exchange tubes 12 and heated by each PTC heater 13, and is then flown out from the outlet header portion 12C through the heat medium outlet path 11C, which contributes to the heating of the heat medium serving as a heat source for heating that circulates within the heat medium circulation circuit 10A.

Thus, according to the heat medium heating device 10 and the vehicle air conditioner 1 of this embodiment, the following operations and effects can be obtained.

In the state where the plurality of flat heat exchange tubes 12 constituting the heat exchange module 14 are stacked and each PTC heater 13 is sandwiched between the flat tube portions 12A, each flat heat exchange tube 12 and each PTC heater 13 are pressed against the inner bottom surface of the lower case 11A by the heat exchange pressing member 15 and fastened and fixed. This allows the plurality of flat heat exchange tubes 12 and the plurality of pairs of PTC heaters 13 to be brought into close contact with each other and incorporated.

Accordingly, the contact thermal resistance between each flat heat exchange tube 12 and each PTC heater 13 is reduced and the heat transfer efficiency is improved, thereby enhancing the performance of the heat medium heating device 10. In addition, each flat heat exchange tube 12 and each PTC heater 13 are stacked in multiple layers, thereby reducing the planar area, thereby reducing the size of the heat exchange module 14 and the heat medium heating device 10.

Further, the connection structure is employed in which the control substrate 17 that controls the energization to each PTC heater 13 is disposed on the upper portion of the heat exchange module 14, and the terminals 25A extending from the electrode plates 25 of each PTC heater 13 are directly connected to the terminal boards (connection portions) 17B. In this case, the heat generated in each PTC heater 13 conducts through the control substrate 17 through the terminals 25A from the electrode plates 25, thereby preventing overheating on the control substrate 17 side. Accordingly, the width dimension of each flat heat exchange tube 12 is set to be greater than the contact surface width by the width dimension L in the direction in which the terminals 25A extend from the electrode plates 25 in the PTC element 24 of each PTC heater 13. In the wide portion 29, the wide portion 29A of each electrode plate 25 and the wide portion 29 of each flat heat exchange tube 12 excluding the PTC element 24 are superimposed.

Accordingly, in the wide portion 29 in which each flat heat exchange tube 12 is wider than the contact surface of the PTC element 24 and is superimposed with each electrode plate 25, the electrode plates 25 are prevented from contacting the contact surface of the PTC element 24 and from being heated. Additionally, the heat transferred to the electrode plates 25 can be radiated to the flat heat exchange tube 12 side through the superimposed wide portion 29A. This makes it possible to reduce the amount of heat transferred to the terminal boards (connection portions) 17B of the control substrate 17 through the terminals 25A extending from the electrode plates 25, and to prevent overheating due to heat conduction from the electrode plates 25 of the control substrate 17.

Additionally, the heat performance of the control substrate 17 is enhanced and malfunction or the like is suppressed, thereby improving the reliability of the heat medium heating device 10.

In this embodiment, the slit 30 is provided along the end side direction in the wide portion 29A which is wider than the contact surface of the PTC element 24 on each electrode plate 25. Accordingly, the slit 30 blocks the heat flow which conducts through the electrode plates 25 toward the terminal 25A side, and the heat conduction distance toward the terminal 25A side is increase to radiate heat within the distance, thereby reducing the temperature of heat transferred to the terminal 25A. This makes it possible to reduce the amount of heat transferred to the terminal boards (connection portions) 17B of the control substrate 17 through the terminals 25A, and the temperature thereof, and to reliably prevent overheating on the control substrate 17 side.

Moreover, the terminals 25A extending from the electrode plates 25 are formed to extend from the end side portion opposed to the region in which the slit 30 is provided. Accordingly, the slit 30 blocks the heat flow that conducts through the electrode plates 25 toward the terminal 25A side, and allows the heat flow to bypass the slit 30 to thereby guide the heat to take the long way toward the terminal 25A side to radiate the heat therebetween, thereby reducing the temperature. Accordingly, the amount of heat transferred to the terminal boards (connection portions) 17B of the control substrate through the terminals 25A, and the temperature thereof can be reliably reduced by the slit 30, and overheating on the control substrate 17 can be prevented.

As described above, the heat medium heated by the heat medium heating device 10 capable of preventing overheating due to the heat conduction from the electrode plates 25 constituting each PTC heater 13, enhancing the heat performance of the control substrate 17, and improving the reliability can be supplied to the radiator 6 disposed in the air flow passage 2. Accordingly, the heating performance of the vehicle air conditioner 1 can be stabilized, and occurrence of malfunction is prevented, for example, thereby improving the reliability.

Note that the present invention is not limited to the invention according to the embodiments described above, but can be modified as appropriate without departing from the scope of the present invention. For example, the embodiments described above illustrates the structure in which the three flat heat exchange tubes 12 are stacked and the plurality of pairs of PTC heaters 13 is incorporated in the flat heat exchange tubes 12. However, the present invention is not limited to this structure. The number of the flat heat exchange tubes 12 and PTC heaters 13 may be increased or reduced as a matter of course. In the embodiments described above, the casing 11 is made of a resin material. However, the material of the casing 11 is not limited thereto. The casing 11 may be made of metal such as metal made by aluminum die casting. This is also included in the present invention.

Further, the electrode plates 25 arranged in contact with the both surfaces of each PTC element 24 enable energization control and capacitance control for the number of sets of the PTC elements 24. Accordingly, the PTC elements 24 are interposed, as needed, for the number of pairs of the PTC elements 24.

What is claimed is:

1. A heat medium heating device, comprising:
   a plurality of flat heat exchange tubes each of which has an inlet header portion, a flat tube portion through which a heat medium from the inlet header portion flows, and an outlet header portion through which the heat medium from the flat tube portion flows out, the flat tube portions which are stacked with each other;
   a PTC heater incorporated between the flat tube portions, the PTC heater including a pair of electrode plates having contact with the flat tube portions, and a PTC element sandwiched by the electrode plates;
   a casing in which the flat heat exchange tubes and the PTC heater are accommodated; and
   a control substrate that is incorporated in the casing and controls the PTC heater, a terminal protruding from a side of the electrode plate of the PTC heater in an extending direction of the electrode plate, the terminal being directly connected to a connection portion of the control substrate,
   wherein a predetermined contact area of the electrode plate has contact with the PTC element,
   wherein the flat tube portion has a width dimension in the extending direction greater than a width of the predetermined contact area in the extending direction, and the electrode plate has contact with the flat tube portion with an area of the electrode plate which is outside of the predetermined contact area and between the PTC element and the terminal, wherein the electrode plates are provided with a slit along an end side direction in the area of the electrode plate and
   wherein the terminal extending from each electrode plate extends from an end side portion opposed to a region in which the slit is provided.

2. A vehicle air conditioner comprising a heat medium heating device that heats a heat medium so as to be circulated with respect to a radiator disposed in an air flow passage, wherein the heat medium heating device is a heat medium heating device according to claim 1.

* * * * *